(12) United States Patent
Welch

(10) Patent No.: US 11,131,314 B2
(45) Date of Patent: Sep. 28, 2021

(54) FAN BLADE WITH STRUCTURAL SPAR AND INTEGRATED LEADING EDGE

(71) Applicant: United Technologies Corporation, Farmington, CT (US)

(72) Inventor: David A. Welch, Quaker Hill, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 894 days.

(21) Appl. No.: 15/265,294

(22) Filed: Sep. 14, 2016

(65) Prior Publication Data
US 2018/0073519 A1 Mar. 15, 2018

(51) Int. Cl.
*F04D 29/02* (2006.01)
*F01D 5/14* (2006.01)
*F04D 29/32* (2006.01)
*F01D 5/28* (2006.01)

(52) U.S. Cl.
CPC .......... *F04D 29/023* (2013.01); *F01D 5/147* (2013.01); *F04D 29/324* (2013.01); *F01D 5/28* (2013.01); *F05D 2220/36* (2013.01); *F05D 2250/11* (2013.01); *F05D 2300/612* (2013.01)

(58) Field of Classification Search
CPC .... F04D 29/023; F04D 29/324; F04D 29/668; F04D 29/02; F01D 5/28; F01D 5/147; F01D 5/16; F01D 5/18; F05D 2220/36; F05D 2250/11; F05D 2300/612; F05D 2260/96; F05D 1/14
See application file for complete search history.

(56) References Cited

U.S. PATENT DOCUMENTS

| 4,118,147 A | * | 10/1978 | Ellis | B23P 6/005 |
| | | | | 416/224 |
| 5,634,771 A | * | 6/1997 | Howard | F01D 5/147 |
| | | | | 416/241 A |
| 5,725,355 A | | 3/1998 | Crall et al. | |
| 6,039,542 A | * | 3/2000 | Schilling | F01D 5/16 |
| | | | | 416/233 |
| 6,364,616 B1 | * | 4/2002 | Stevenson | B64C 11/00 |
| | | | | 416/233 |
| 7,575,417 B2 | * | 8/2009 | Finn | F01D 5/147 |
| | | | | 416/230 |
| 7,588,421 B2 | * | 9/2009 | Burdgick | F01D 5/147 |
| | | | | 416/231 R |

(Continued)

FOREIGN PATENT DOCUMENTS

| EP | 1152123 A2 | 11/2001 |
| EP | 2243929 A2 | 10/2010 |
| WO | 2015102715 A2 | 7/2015 |

OTHER PUBLICATIONS

European Search Report for EP Application No. 17191060.7 dated Jun. 1, 2018; 8 pages.

*Primary Examiner* — Igor Kershteyn
*Assistant Examiner* — Joshua R Beebe
(74) *Attorney, Agent, or Firm* — Cantor Colburn LLP

(57) ABSTRACT

An airfoil includes a leading edge, a trailing edge, a pressure side extending between the leading and the trailing edge, and a suction side that is disposed opposite the pressure side extending between the leading edge and the trailing edge. The airfoil further includes a spar and a structural member. The spar defines the leading edge. The structural member is bonded to the spar.

13 Claims, 4 Drawing Sheets

(56) References Cited

U.S. PATENT DOCUMENTS

| | | | | |
|---|---|---|---|---|
| 8,083,489 | B2* | 12/2011 | Viens | F01D 5/147 |
| | | | | 416/229 A |
| 8,172,541 | B2* | 5/2012 | Cairo | F04D 29/023 |
| | | | | 416/229 R |
| 9,121,284 | B2* | 9/2015 | Pope | F01D 5/16 |
| 2005/0249601 | A1* | 11/2005 | Burdgick | F01D 5/282 |
| | | | | 416/229 A |
| 2005/0254955 | A1* | 11/2005 | Helder | B23K 20/122 |
| | | | | 416/233 |
| 2013/0195652 | A1* | 8/2013 | Pope | F01D 5/141 |
| | | | | 416/1 |
| 2016/0252104 | A1 | 9/2016 | Hui et al. | |
| 2017/0023008 | A1* | 1/2017 | Roche | F01D 5/282 |

\* cited by examiner

FAN BLADE WITH STRUCTURAL SPAR AND INTEGRATED LEADING EDGE

BACKGROUND

This disclosure relates to a fan blade, and more particularly to a hybrid composite fan blade with a structural spar and an integrated leading edge.

Gas turbine engines are provided with fan modules that include fan blades and cases configured to contain the fan blades. Fan blades include a durable leading edge that is bonded onto a lower impact resistant material. These fan blades having the durable leading edge tend to be costly to purchase in difficult to produce.

Accordingly, it is desirable to provide a lower-cost and producible fan blade with a durable leading edge.

BRIEF DESCRIPTION

According to an embodiment of the present disclosure, a fan blade for a gas turbine engine is provided. The fan blade includes an airfoil having a leading edge, a trailing edge, a spar, and a structural member. The spar defines the leading and the trailing edge. The spar has a spar exterior surface and a spar interior surface that extend between the leading edge and the trailing edge. At least a portion of the leading edge, the spar interior surface, and at least a portion of the trailing edge defines a pocket. The structural member is received within the pocket. The structural member has a structural member exterior surface and a structural member interior surface.

In addition to one or more of the features described above, or as an alternative to any of the foregoing embodiments, the spar exterior surface defines a suction side of the airfoil and the structural member exterior surface at least partially defines a pressure side of the airfoil.

In addition to one or more of the features described above, or as an alternative to any of the foregoing embodiments, the spar is made of a first material and the structural member is made of a second material that is different from the first material.

In addition to one or more of the features described above, or as an alternative to any of the foregoing embodiments, the structural member interior surface abuts the spar interior surface.

In addition to one or more of the features described above, or as an alternative to any of the foregoing embodiments, a first region of the structural member interior surface is spaced apart from the spar interior surface and a second region of the structural member interior surface abuts the spar interior surface.

In addition to one or more of the features described above, or as an alternative to any of the foregoing embodiments, a fill is disposed between the first region of the structural member interior surface and the spar interior surface.

In addition to one or more of the features described above, or as an alternative to any of the foregoing embodiments, the spar defines a window that extends from the spar interior surface towards the spar exterior surface.

In addition to one or more of the features described above, or as an alternative to any of the foregoing embodiments, the airfoil further comprising an insert that as at least partially received within the window.

According to another embodiment of the present disclosure, a fan blade for a gas turbine engine is provided. The fan blade includes an airfoil having a leading edge, a trailing edge, and a spar. The spar includes a head and a spar body. The head defines the leading edge and has a first arm and a second arm. The spar body extends from the head towards the trailing edge. The spar body has a first side and a second side disposed opposite the first side.

In addition to one or more of the features described above, or as an alternative to any of the foregoing embodiments, the spar body defines a window that extends from at least one of the first side and the second side towards the opposite of the at least one of the first side and the second side.

In addition to one or more of the features described above, or as an alternative to any of the foregoing embodiments, the airfoil further comprising an insert that is at least partially received within the window.

In addition to one or more of the features described above, or as an alternative to any of the foregoing embodiments, the fan blade further includes a first structural member that engages the first arm and the first side.

In addition to one or more of the features described above, or as an alternative to any of the foregoing embodiments, the fan blade further includes a second structural member that engages the second arm and the second side.

In addition to one or more of the features described above, or as an alternative to any of the foregoing embodiments, first structural member and the second structural member define the trailing edge.

According to yet another embodiment of the present disclosure, a gas turbine engine is provided. The gas turbine engine includes an airfoil having a leading edge, a trailing edge, a pressure side extending between the leading and the trailing edge, and a suction side that is disposed opposite the pressure side extending between the leading edge and the trailing edge. The airfoil includes a spar and a structural member. The spar defines the leading edge and is made of a first material. The structural member is bonded to the spar and is made of a second material that is different from the first material.

In addition to one or more of the features described above, or as an alternative to any of the foregoing embodiments, the spar has a spar exterior surface defining the pressure side and a spar interior surface that extends from the leading edge towards the trailing edge, the spar interior surface defining a pocket that at least partially receives the structural member.

In addition to one or more of the features described above, or as an alternative to any of the foregoing embodiments, the structural member has a structural member interior surface that at least partially engages the spar interior surface and a structural member exterior surface that is disposed opposite the structural member interior surface, the structural member exterior surface defining the pressure side.

In addition to one or more of the features described above, or as an alternative to any of the foregoing embodiments, the spar includes a head having a first arm and a second arm; and a spar body that extends from the head, the spar body having a first side and a second side that is disposed opposite the first side.

In addition to one or more of the features described above, or as an alternative to any of the foregoing embodiments, the structural member engages the first arm and the first side and defines the pressure side.

In addition to one or more of the features described above, or as an alternative to any of the foregoing embodiments, a second structural member that engages the second arm and the second side and defines the suction side, wherein the structural member and the second structural member define the trailing edge.

BRIEF DESCRIPTION OF THE DRAWINGS

The subject matter which is regarded as the present disclosure is particularly pointed out and distinctly claimed in the claims at the conclusion of the specification. The foregoing and other features, and advantages of the present disclosure are apparent from the following detailed description taken in conjunction with the accompanying drawings in which:

DETAILED DESCRIPTION

Referring now to the Figures, where the present disclosure will be described with reference to specific embodiments, without limiting same, it is to be understood that the disclosed embodiments are merely illustrative and may be embodied in various and alternative forms. The Figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present disclosure.

Figure 1:
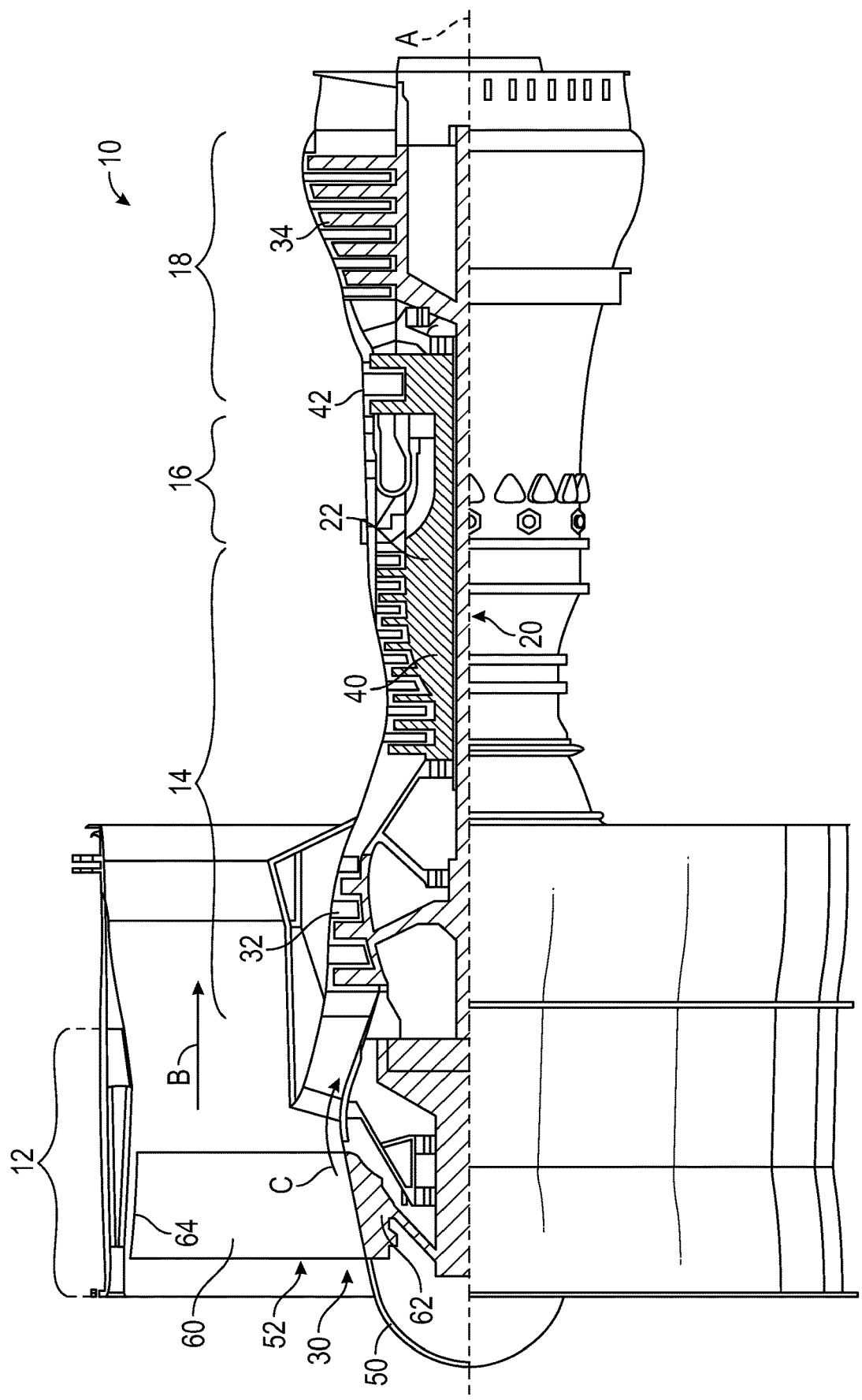
FIG. 1 is a schematic representation of a gas turbine engine having a fan blade.

Referring to FIG. 1 a schematic representation of a gas turbine engine 10 is shown. The gas turbine engine includes a fan section 12, a compressor section 14, a combustor section 16, and a turbine section 18 disposed about a longitudinal axis A. The fan section 12 drives air along a bypass flow path B that may bypass the compressor section 14, the combustor section 16, and the turbine section 18. The compressor section 14 draws air in along a core flow path C where air is compressed by the compressor section 14 and is provided to or communicated to the combustor section 16. The compressed air is heated by the combustor section 16 to generate a high pressure exhaust gas stream that expands through the turbine section 18. The turbine section 18 extracts energy from the high pressure exhaust gas stream to drive the fan section 12 and the compressor section 14.

The gas turbine engine 10 further includes a low-speed spool 20 and a high-speed spool 22 that are configured to rotate the fan section 12, the compressor section 14, and the turbine section 18 about the longitudinal axis A. The low-speed spool 20 may connect a fan 30 of the fan section 12 and a low-pressure compressor portion 32 of the compressor section 14 to a low-pressure turbine portion 34 of the turbine section 18. The high-speed spool 22 may connect a high pressure compressor portion 40 of the compressor section 14 and a high pressure turbine portion 42 of the turbine section 18.

The fan 30 includes a fan rotor or fan hub 50 that carries a fan blade 52. The fan blade 52 radially extends from the fan hub 50. The fan blade 52 may be a lightweight composite fan blade that includes an airfoil 60 that radially extends between a root 62 and a tip 64.

Figure 2:
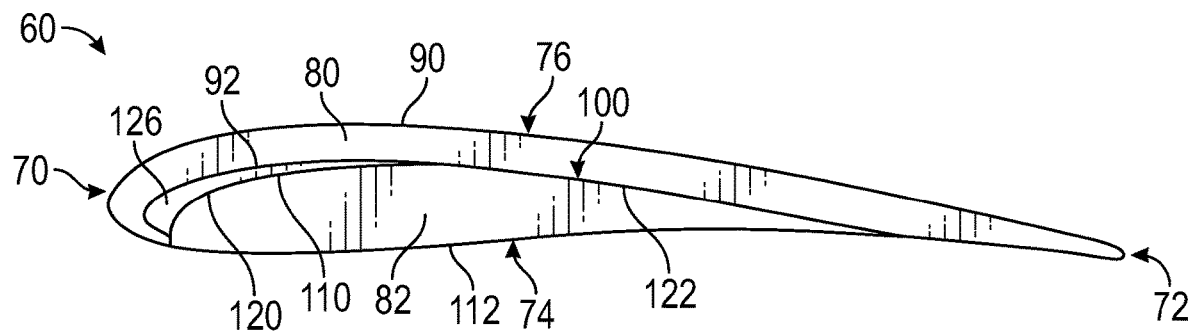
FIG. 2 is an end view of a first embodiment of an airfoil.
Figure 3:
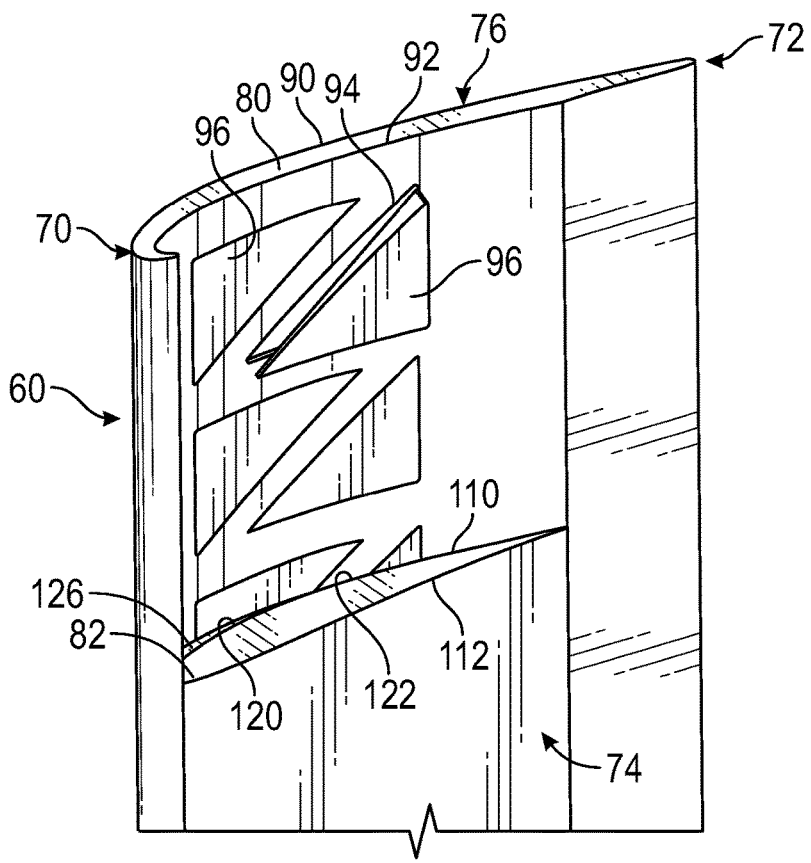
FIG. 3 is a partial perspective view of the first embodiment of the airfoil.

Referring to FIGS. 2 and 3, an airfoil 60 is illustrated. The airfoil 60 includes a leading edge 70, trailing edge 72, a pressure side 74, and a suction side 76. The leading edge 70 is spaced apart from and is disposed opposite the trailing edge 72. The leading edge 70 extends between the pressure side 74 and the suction side 76 such that the leading edge 70 includes at least a portion of the pressure side 74 and at least a portion of the suction side 76. The pressure side 74 and the suction side 76 each axially extends between the leading edge 70 and the trailing edge 72. The pressure side 74 and the suction side 76 each radially extend from the root 62 to the tip 64. The pressure side 74 and suction side 76 each connect the leading edge 70 to the trailing edge 72. The pressure side 74 is configured as a concave surface. The suction side 76 is disposed opposite the pressure side 74 and is configured as a convex surface.

The airfoil 60 is formed by a spar 80 and a structural member 82. The spar 80 defines the leading edge 70 and the trailing edge 72 of the airfoil 60. The spar 80 is made of a first material. The first material may be a metallic material such as titanium, steel, aluminum, or the like.

The spar 80 includes a spar exterior surface 90 and a spar interior surface 92 disposed opposite the spar exterior surface 90. The spar exterior surface 90 defines the suction side 76 of the airfoil 60. The spar interior surface 92 defines the pressure side 74 of the airfoil 60.

The spar 80 defines a window 94. The window 94 extends from the spar interior surface 92 towards the spar exterior surface 90. The window 94 may partially extend through the spar 80. A plurality of windows may be provided such that they form a truss frame. In at least one embodiment, the window 94 extends from the tip 64 of the airfoil 60 towards the root 62 of the airfoil 60. In such an embodiment, the window 94 is disposed between the spar exterior surface 90 and the spar interior surface 92. As illustrated in FIG. 3, the window 94 may have a generally triangular shape, however other shapes and configurations of windows are also contemplated. The sizing and shape of the window 94 may optimize strength and weight capabilities of the airfoil 60 of the fan blade 52.

An insert 96 is provided that is at least partially received or at least partially disposed within the window 94. The insert 96 may be a lightweight insert such as a foam plug, a composite plug, a structural fill, a thermoplastic fill, a metal structure fill, or the like.

At least a portion of the leading edge 70, the spar interior surface 92, and the trailing edge 72 define a pocket 100. The pocket 100 extends from a fan blade tip towards a fan blade root. The pocket 100 extends between and is spaced apart from each of the leading edge 70 and the trailing edge 72. The structural member 82 is received within the pocket 100. The structural member 82 extends from the leading edge 70 towards the trailing edge 72. The structural member 82 is spaced apart from the trailing edge 72 that is defined by the spar 80. The structural member 82 is made of a second material that is different from the first material. The second material may be a composite, a laminate, a thermoplastic, or the like.

The structural member 82 includes a structural member interior surface 110 and a structural member exterior surface 112 that is disposed opposite the structural member interior surface 110. The structural member interior surface 110 at least partially engages the spar interior surface 92. The structural member interior surface 110 includes a first region 120 and a second region 122 that is disposed adjacent to the first region 120.

The first region 120 is disposed proximate the leading edge 70. The first region 120 is spaced apart from the spar interior surface 92. A fill 126 is provided. The fill 126 is disposed between the first region 120 and the spar interior surface 92. The fill 126 aides in staging, bonding, or joining the structural member 82 to the spar 80. The fill 126 may also be used to improve structural impact resistance and damage resistance to the structural member 82.

The second region 122 extends towards the trailing edge 72. The second region 122 abuts the spar interior surface 92. The second region 122 of the structural member interior surface 110 is bonded or joined to the spar interior surface 92 by an adhesive or may be co-cured during the part fabrication. The second region 122 of the structural member interior surface 110 or the spar interior surface 92 are provided with a bonding enhancement features such as a surface roughening or knurlings to increase the bond strength of the adhesive to bond or join the structural member 82 to the spar 80.

Figure 4:
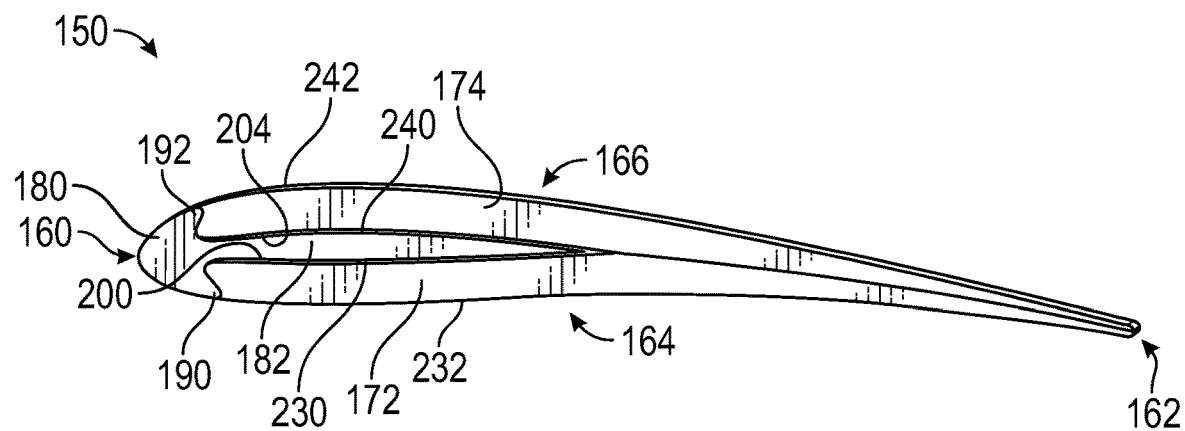
FIG. 4 is an end view of a second embodiment of an airfoil.
Figure 5:
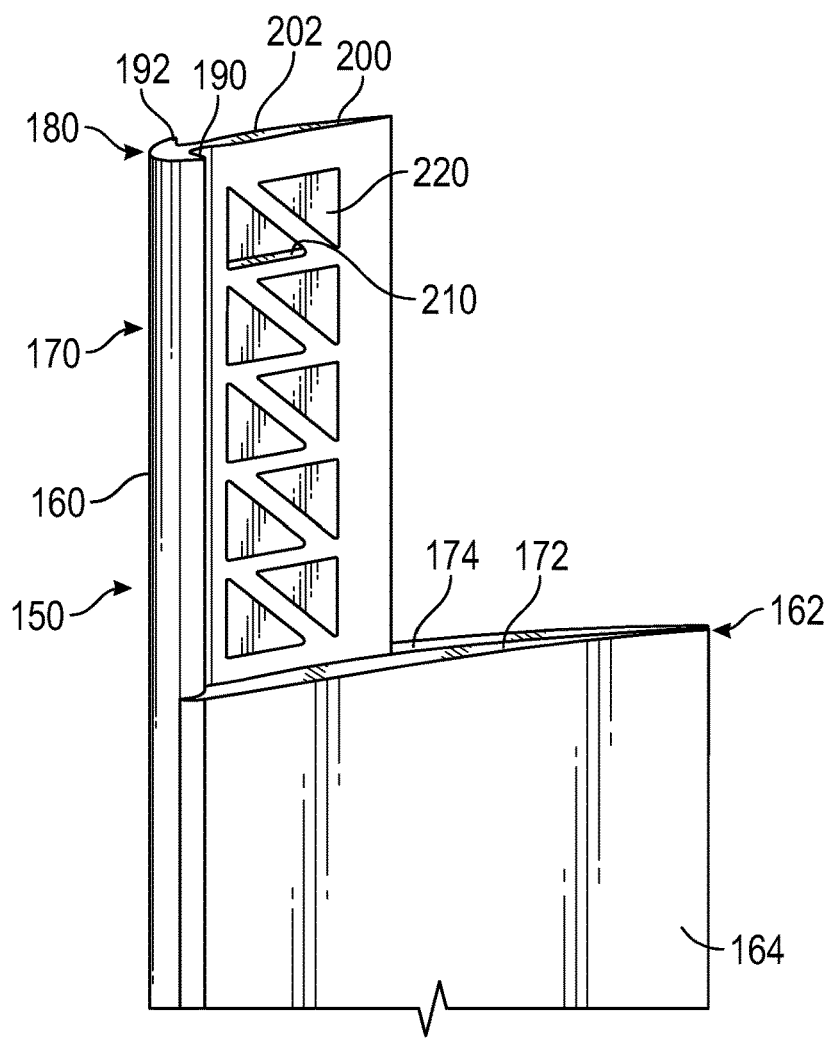
FIG. 5 is a partial cutaway view of the spar of the second embodiment of the airfoil.
Figure 6:
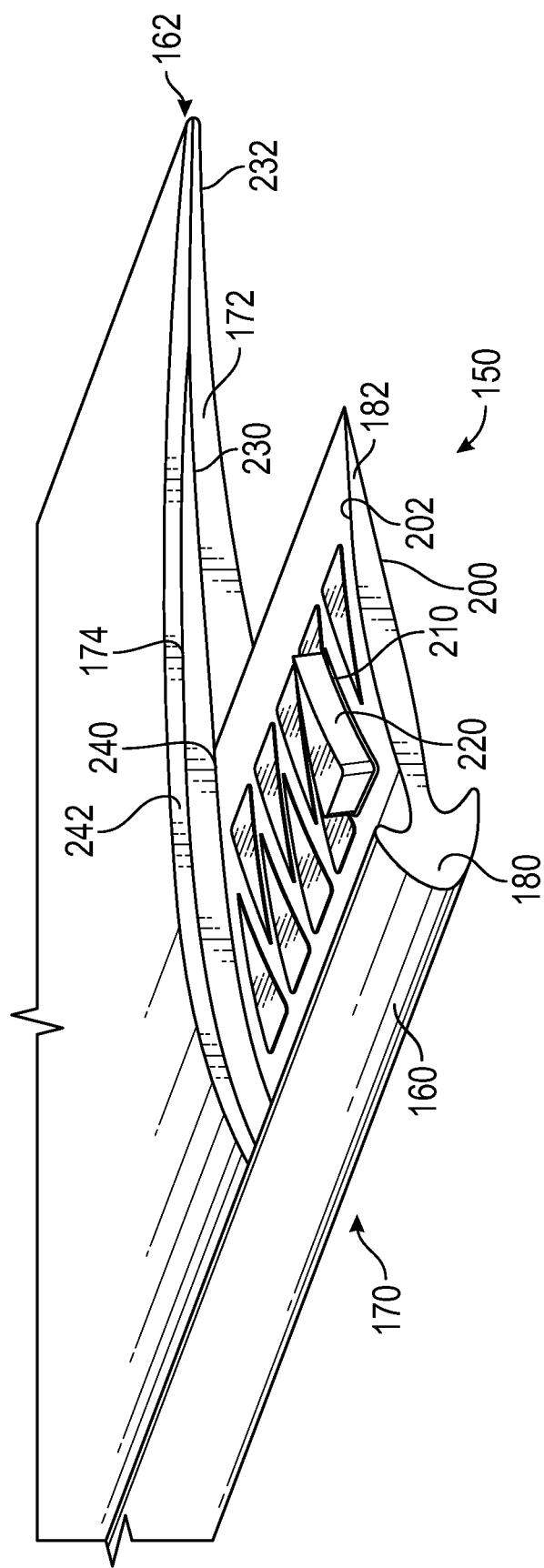
FIG. 6 is a partial perspective view of the spar having an insert of the second embodiment of the airfoil.

Referring to FIGS. 4-6, an airfoil 150 is illustrated. The airfoil 150 includes a leading edge 160, trailing edge 162, a pressure side 164, and a suction side 166. The leading edge 160 is spaced apart from and is disposed opposite the trailing edge 162. The leading edge 160 extends between the pressure side 164 and the suction side 166 such that the leading edge 160 includes at least a portion of the pressure side 164 and at least a portion of the suction side 166. The pressure side 164 and the suction side 166 each axially extends between the leading edge 160 and the trailing edge 162. The pressure side 164 and the suction side 166 each radially extend from the root to the tip. The pressure side 164 and suction side 166 each connect the leading edge 160 to the trailing edge 162. The pressure side 164 is configured as a concave surface. The suction side 166 is disposed opposite the pressure side 164 and is configured as a convex surface.

The airfoil 150 is formed by a spar 170, a first structural member 172, and a second structural member 174. The spar 170 is made of a first material. The first material may be a metallic material such as titanium, steel, aluminum, or the like.

The spar 170 includes a head 180 and a spar body 182 that extends from the head 180. The head 180 defines a leading edge 160 of the airfoil 60. The head 180 includes a first arm 190 and a second arm 192. The first arm 190 extends from the head 180 towards the trailing edge 162. The second arm 192 is axially or circumferentially spaced apart from the first arm 190. The second arm 192 extends from the head 180 towards the trailing edge 162.

The spar body 182 extends from the head of 180 towards the trailing edge 162. The spar body 182 is disposed between the first arm 190 and the second arm 192. The spar body 182 includes a first side 200 and the second side 202. The first arm 190 extends at least partially over the first side 200. The second side 202 is disposed opposite the first side 200. The second arm 192 extends at least partially over the second side 202.

The spar body 182 defines a window 210. The window 210 extends from at least one of the first side 200 and the second side 202 towards the opposite of the at least one of the first side 200 and the second side 202. The window 210 may partially extend through the spar body 182. A plurality of windows may be provided such that they form a truss frame. In at least one embodiment, the window 210 extends from the tip of the airfoil 150 towards the root of the airfoil 150. In such an embodiment, the window 210 is disposed between the first side 200 and the second side 202. As illustrated in FIGS. 5 and 6, the window 210 may have a generally triangular shape, however other shapes and configurations of windows are also contemplated.

An insert 220 is provided that is at least partially received or at least partially disposed within the window 210. The insert 220 may be a lightweight insert such as a foam plug, a composite plug, a structural fill, a thermoplastic fill, a metal structure fill, or the like.

The first structural member 172 engages the first arm 190 of the head 180 and the first side 200 of the spar body 182. The first structural member 172 extends towards the trailing edge 162. The first structural member 172 is made of a second material that is different from the first material. The second material may be a composite, a laminate, a thermoplastic, or the like that forms composite plies.

An interior surface 230 of the first structural member 172 is bonded to or joined to the first arm 190 of the head 180 of the spar 170 and the first side 200 of the spar body 182 of the spar by an adhesive. The interior surface 230 of the first structural member 172, the first arm 190 of the head 180, and/or the first side 200 of the spar body 182 are provided with bonding enhancement features such as surface roughening or knurlings to increase the bond strength of the adhesive tube bond or join the first structural member 172 to the spar 170.

An exterior surface 232 of the first structural member 172 is disposed opposite the interior surface 230 of the first structural member 172. The exterior surface 232 of the first structural member 172 defines the pressure side 164 of the airfoil 150.

The second structural member 174 is disposed opposite the first structural member 172. The second structural member 174 engages the second arm 192 of the head 180 and the second side 202 of the spar body 182. The second structural member 174 extends towards the trailing edge 162. The first structural member 172 and the second structural member 174 define the trailing edge 162 of the airfoil 150. The first structural member 172 and the second structural member 174 engage each other within a region that extends between an end of the spar body 182 and the trailing edge 162.

The second structural member 174 is made of a third material that is different from the first material. The third material may be substantially similar to the second material. The third material may be a composite, a laminate, a thermoplastic, or the like that forms composite plies.

An interior surface 240 of the second structural member 174 is bonded to or joined to the second arm 192 of the head 180 of the spar 170 and the second side 202 of the spar body 182 of the spar 170 by an adhesive. The interior surface 240 of the second structural member 174, the second arm 192 of the head 180, and/or the second side 202 of the spar body 182 are provided with bonding enhancement features such as surface roughening or knurlings to increase the bond strength of the adhesive tube bond or join the second structural member 174 to the spar 170.

An exterior surface 242 of the second structural member 174 is disposed opposite the interior surface 240 of the second structural member 174. The exterior surface 242 of the second structural member 174 defines the suction side 166 of the airfoil 150.

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions or equivalent arrangements not heretofore described, but which are commensurate with the scope of the present disclosure. Additionally, while various embodiments of the present disclosure have been described, it is to be understood that aspects of the present disclosure may include only some of the described embodiments. Accordingly, the present disclosure is not to be seen as limited by the foregoing description, but is only limited by the scope of the appended claims.

The invention claimed is:

1. A fan blade for a gas turbine engine, comprising:
an airfoil having a leading edge and a trailing edge, the airfoil including:
a spar defining the leading edge and the trailing edge, the spar having a spar exterior surface and a spar interior surface, the spar exterior surface extending continuously between the leading edge and the trailing edge and defining the leading edge, the trailing edge and a suction side of the airfoil, at least a portion of the leading edge, the spar interior surface, and at least a portion of the trailing edge defining a pocket;
a structural member received within the pocket, the structural member having a structural member exterior surface and a structural member interior surface;
a first plurality of triangular-shaped windows formed in the spar that extend from the spar interior surface towards the spar exterior surface, the first plurality of windows arranged in a spanwise extending first row with a side of the first plurality of windows extending along the spanwise extending first row;
an opposing second plurality of triangular-shaped windows formed in the spar, the second plurality of windows arranged in a spanwise extending second row, the first plurality of windows overlapping the second plurality of windows in a chordwise direction; and
an insert disposed in each window of the plurality of windows.

2. The fan blade of claim 1, wherein the structural member exterior surface at least partially defines a pressure side of the airfoil.

3. The fan blade of claim 1, wherein the spar is made of a first material and the structural member is made of a second material that is different from the first material.

4. The fan blade of claim 1, wherein the structural member interior surface abuts the spar interior surface.

5. The fan blade of claim 1, wherein a first region of the structural member interior surface is spaced apart from the spar interior surface and a second region of the structural member interior surface abuts the spar interior surface, the first region disposed proximate the leading edge.

6. The fan blade of claim 5, further comprising a fill that is disposed between the first region of the structural member interior surface and the spar interior surface.

7. A fan blade for a gas turbine engine, comprising:
an airfoil having a leading edge and a trailing edge, the airfoil including:
a spar having:
a head defining the leading edge, the head having a first arm and a second arm;
a spar body extending from the head towards the trailing edge, spar body having a first side and a second side that is disposed opposite the first side;
a plurality of triangular-shaped windows formed in the spar, each window extending from at least one of the first side and the second side towards the opposite of the at least one of the first side and the second side the plurality of triangular-shaped windows including:
a first plurality of triangular-shaped arranged in a spanwise extending first row with a side of the first plurality of windows extending along the spanwise extending first row;
an opposing second plurality of triangular-shaped windows arranged in a spanwise extending second row, the first plurality of windows overlapping the second plurality of windows in a chordwise direction;
a first structural member that engages the first arm and the first side and extends toward the trailing edge;
a second structural member that engages the second arm and the second side and extends toward the trailing edge; and
a plurality of inserts, each insert of the plurality of inserts at least partially received in a window of the plurality of windows;
wherein the first structural member engages the second structural member between an end of the spar body and the trailing edge;
wherein the first arm extends at least partially over the first side.

8. The fan blade of claim 7, wherein the first structural member and the second structural member define the trailing edge.

9. A gas turbine engine, comprising:
an airfoil having a leading edge, a trailing edge, a pressure side extending between the leading and the trailing edge, and a suction side that is disposed opposite the pressure side extending between the leading edge and the trailing edge, the airfoil including:
a spar defining the leading edge, the spar being made of a first material; and
a structural member bonded to the spar, the structural member being made of a second material that is different from the first material;
a plurality of triangular-shaped windows formed in the spar, the plurality of triangular-shaped windows including:
a first plurality of triangular-shaped arranged in a spanwise extending first row with a side of the first plurality of windows extending along the spanwise extending first row;
an opposing second plurality of triangular-shaped windows arranged in a spanwise extending first second row, the first plurality of windows overlapping the second plurality of windows in a chordwise direction; and
a plurality of inserts, each insert of the plurality of inserts at least partially received in a window of the plurality of windows;
wherein the spar exterior surface defines the suction side of the airfoil extending from the leading edge to the trailing edge;
wherein the spar includes:
a head having a first arm and a second arm; and
a spar body that extends from the head, the spar body having a first side and a second side that is disposed opposite the first side;
wherein the first arm extends at least partially over the first side.

10. The gas turbine engine of claim 9, wherein the spar has a spar exterior surface partially defining the pressure side and a spar interior surface that extends from the leading edge towards the trailing edge, the spar interior surface defining a pocket that at least partially receives the structural member.

11. The gas turbine engine of claim 10, wherein the structural member has a structural member interior surface that at least partially engages the spar interior surface and a structural member exterior surface that is disposed opposite the structural member interior surface, the structural member exterior surface partially defining the pressure side.

12. The gas turbine engine of claim 9, wherein the structural member engages the first arm and the first side and defines the pressure side.

13. The gas turbine engine of claim 12, further comprising a second structural member that engages the second arm and the second side and defines the suction side, wherein the structural member and the second structural member define the trailing edge.

\* \* \* \* \*